(12) United States Patent
Abnous et al.

(10) Patent No.: US 8,819,048 B1
(45) Date of Patent: Aug. 26, 2014

(54) VIRTUAL REPOSITORY MANAGEMENT TO PROVIDE RETENTION MANAGEMENT SERVICES

(75) Inventors: Razmik Abnous, Danville, CA (US); Victor Spivak, San Mateo, CA (US); Eric Merhoff, Walnut Creek, CA (US)

(73) Assignee: EMC Corporation, Hopkinton, MA (US)

( * ) Notice: Subject to any disclaimer, the term of this patent is extended or adjusted under 35 U.S.C. 154(b) by 33 days.

(21) Appl. No.: 11/355,555

(22) Filed: Feb. 16, 2006

Related U.S. Application Data (60) Provisional application No. 60/729,987, filed on Oct. 24, 2005, provisional application No. 60/764,896, filed on Feb. 3, 2006.

(51) Int. Cl.
*G06F 7/00* (2006.01)

(52) U.S. Cl.
USPC .......................... 707/762; 707/702; 707/803

(58) Field of Classification Search
USPC .............. 707/2, 3, 8, 10, 101, 102, 201, 762, 707/702, 803
See application file for complete search history.

(56) References Cited

U.S. PATENT DOCUMENTS

| | | | |
|---|---|---|---|
| 4,506,326 A | | 3/1985 | Shaw et al. |
| 5,684,991 A * | 11/1997 | Malcolm | 707/640 |
| 5,689,550 A * | 11/1997 | Garson et al. | 379/88.18 |
| 5,721,911 A * | 2/1998 | Ha et al. | 707/100 |
| 5,880,730 A | | 3/1999 | Durand |
| 5,943,666 A | | 8/1999 | Kleewein et al. |
| 6,058,389 A * | 5/2000 | Chandra et al. | 707/1 |
| 6,094,660 A | | 7/2000 | Glitho |
| 6,304,882 B1 * | 10/2001 | Strellis et al. | 707/202 |
| 6,564,215 B1 * | 5/2003 | Hsiao et al. | 707/8 |
| 7,047,258 B2 * | 5/2006 | Balogh et al. | 707/610 |
| 7,107,416 B2 * | 9/2006 | Stuart et al. | 711/159 |
| 7,107,597 B2 * | 9/2006 | Shappir et al. | 719/328 |
| 7,668,849 B1 | | 2/2010 | Narancic et al. |
| 8,001,612 B1 | | 8/2011 | Wieder |
| 2002/0048369 A1 * | 4/2002 | Ginter et al. | 380/277 |
| 2002/0055932 A1 | | 5/2002 | Wheeler et al. |
| 2002/0103789 A1 | | 8/2002 | Turnbull et al. |

(Continued)

FOREIGN PATENT DOCUMENTS

| | | |
|---|---|---|
| WO | WO99/66427 | 12/1999 |
| WO | 2005/101191 | 10/2005 |

OTHER PUBLICATIONS

Li et al.: "A Multi-Tiered Collaborative Commerce Model Based on the Integration of CORBA and EJB" Systems, Man and Cybernetics, 2004 IEEE International Conference on, IEEE, Piscataway, NJ, USA, vol. 5, Oct. 10, 2004. pp. 4078-4083, XP010772956 ISBN: 978-0-7803-8566-5.

(Continued)

*Primary Examiner* — Khanh Pham
*Assistant Examiner* — Bruce Witzenburg
(74) *Attorney, Agent, or Firm* — Van Pelt, Yi & James LLP (57) ABSTRACT

Virtually managing repositories to provide retention management services is disclosed. An indication is received that a retention management service is desired to be performed with respect to an external content item. A reference object is created that represents the external content item. The reference object is used to perform the retention management service with respect to the external content item.

29 Claims, 9 Drawing Sheets (56) References Cited

U.S. PATENT DOCUMENTS

| | | |
|---|---|---|
| 2003/0046239 A1 | 3/2003 | Geilfuss et al. |
| 2003/0093774 A1 | 5/2003 | Hilton |
| 2003/0187821 A1 | 10/2003 | Cotton et al. |
| 2004/0199867 A1 | 10/2004 | Brandenborg et al. |
| 2004/0215635 A1 | 10/2004 | Chang et al. |
| 2005/0065987 A1* | 3/2005 | Telkowski et al. ............ 707/204 |
| 2005/0097260 A1* | 5/2005 | McGovern et al. ........... 711/100 |
| 2005/0108189 A1 | 5/2005 | Samsonov |
| 2005/0198196 A1 | 9/2005 | Bohn et al. |
| 2006/0004689 A1 | 1/2006 | Chandrasekaran et al. |
| 2006/0010146 A1 | 1/2006 | Nayak |
| 2006/0053169 A1 | 3/2006 | Straub et al. |
| 2006/0115241 A1 | 6/2006 | Saigo et al. |
| 2007/0073686 A1 | 3/2007 | Brooks et al. |
| 2008/0021921 A1 | 1/2008 | Horn |

OTHER PUBLICATIONS

Gopalan Suresh Raj: "Enterprise Java Beans—Part 1" Internet Citation, [Online] XP002253847 Retrieved from the Internet: URL: wysiwyg://112/http://members.tripod.com/gsraj/ejb/chapter/> [retrieved on Sep. 8, 2003].

* cited by examiner

VIRTUAL REPOSITORY MANAGEMENT TO PROVIDE RETENTION MANAGEMENT SERVICES

CROSS REFERENCE TO OTHER APPLICATIONS

This application claims priority to U.S. Provisional Patent Application No. 60/729,987 entitled VIRTUAL REPOSITORY MANAGEMENT filed Oct. 24, 2005, which is incorporated herein by reference for all purposes.

This application claims priority to U.S. Provisional Patent Application No. 60/764,896 entitled VIRTUAL REPOSITORY MANAGEMENT TO PROVIDE RETENTION MANAGEMENT SERVICES filed Feb. 3, 2006, which is incorporated herein by reference for all purposes.

BACKGROUND OF THE INVENTION

Information can be stored or managed by systems designed to help organize, manage, or otherwise provide useful functionality to the user or owner of the information. In some cases, an owner of information can have multiple systems that are managing or storing information that the owner desires to be able to control or manage in a similar, uniform, consistent, and/or verifiable manner. This can be especially true for documents that need to be retained or disposed for regulatory purposes. For example, financial, corporate, litigation, medical, personnel, and securities information may all have requirements that an owner would want to meet for information in all of the systems that the owner has information stored in or managed by. However, the multiple systems may not be able to be controlled or managed natively in a similar or uniform manner. One approach to this problem has been to migrate content to a common platform, such as a common content management system, but in many cases such migration is time consuming and otherwise costly, given the vast amounts of data held and/or produced by some enterprises, for example, and migration does not enable owners of data to take advantage of useful life and/or desirable characteristics and/or native functionality of legacy systems. It would be beneficial to be able to control or manage multiple systems with different characteristics in a similar or uniform manner.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Virtually managing repositories to provide retention management services is disclosed. An indication is received that a retention management functionality is desired to be available and/or performed with respect to one or more external content objects. As used herein, the term "external content item" refers to a content item, such as a file or other stored item, that is not ingested by and brought under direct control of a content management system and/or other system or application that is being used and/or configured to perform one or more content management functions with respect to the content item. Examples of external content items include files and other items managed by a "legacy" (for example, an older version of a content management system) or other content management system that is of a different type, e.g., from a different vendor or designed for a purpose other than content management (for example, customer relations management), than a content management system or application that is being used to provide one or more content management functions with respect to items stored in and managed by the legacy or other system. In some embodiments, retention management is the management of content so that policies for retaining the content or not retaining the content can be applied to the content. For example, email is retained for 1 year and then deleted; financial records are retained for one year in near line storage and then transferred to a write once media for archiving; and content in designated temporary directories is removed without any archiving after 24 hours. For each of the one or more external content items a reference object is created that represents the external item and enables the retention management functionality to be performed with respect to the external content item.

Figure 1:
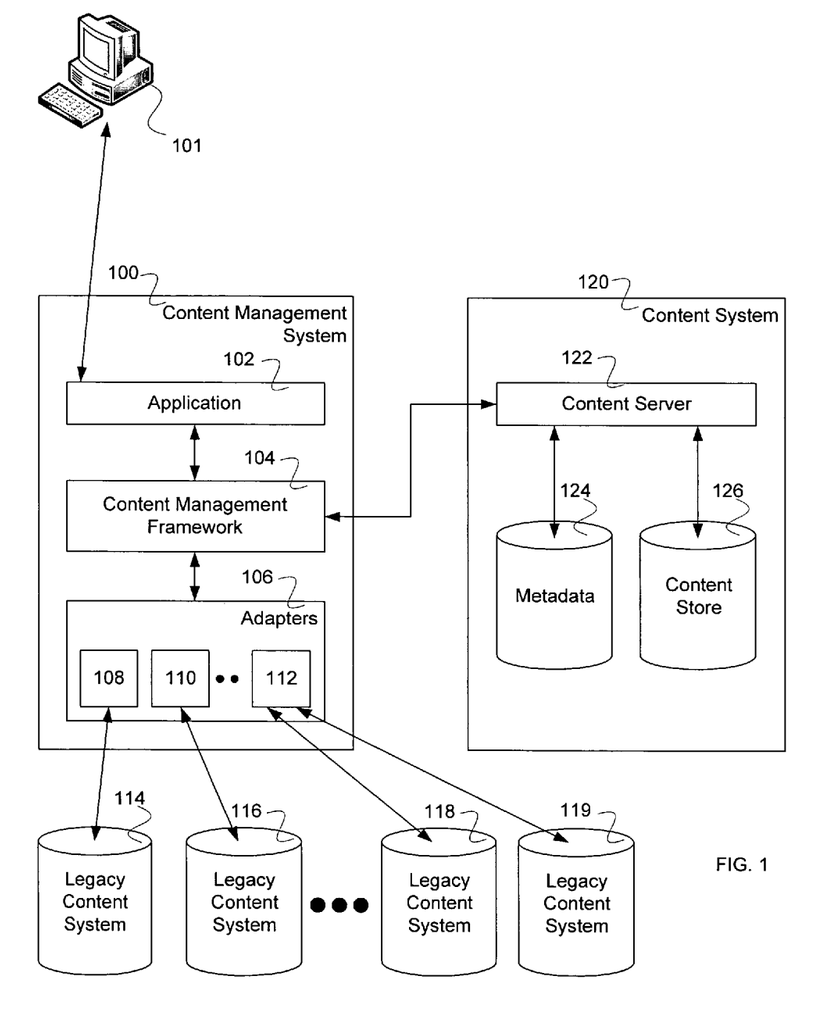
FIG. 1 is a block diagram illustrating an embodiment of a system for virtually managing repositories to provide retention management services.

FIG. 1 is a block diagram illustrating an embodiment of a system for virtually managing repositories to provide retention management services. In the example shown, content management system 100, which can provide retention management services, is coupled to content system 120 and one or more user systems, which are represented in FIG. 1 by the personal computer or workstation 101. In various embodiments, content management system 100 is coupled to content system 120 and one or more user systems using a local network, a wide area network, the Internet, a wired network, a wireless network, or a direct connection. In some embodiments, users are coupled or connected to a system that is in turn coupled or connected to content management system 100 via network or direct connections. Content management system 100 is also coupled to one or more external content systems, represented in FIG. 1 by legacy content systems 114, 116, 118, and 119. Content management system 100 provides uniform or centrally managed retention management services for one or more pieces of content that are stored in content system 120 as well as one or more pieces of content that are stored in one or more external content systems. In some embodiments, an external content system comprises a system with associated content that has not been ingested into content management system 100 where the ingestion of content comprises taking the associated content under direct management and control of content management system 100. In various embodiments, a legacy or other external content system comprises an enterprise content management (ECM) system, an enterprise resource planning (ERP) system, a customer relations management (CRM) system, a business process management (BPM) system, different version of a system (for example, an older version of content management system 100), enterprise content integration (ECI) system, or enterprise application integration (EAI) system. In some embodiments, external content systems that are not "legacy" content systems, i.e. not an older system that is being managed by a newer content management system 100, are managed virtually as described herein. In some embodiments, a legacy or other external content system includes a content server, metadata, and a content store similar to content system 120. In some embodiments, a legacy content system comprises a data repository.

In the example shown in FIG. 1, content management system 100 includes application 102, content management framework 104, and adapters 106. One or more user systems interact with application 102 in order to make use of content management system retention management functionality. In various embodiments, application 102 interacts with content management framework 104 that enables access to information or content that is stored in legacy content systems 114, 116, 118, and 119 and/or content system 120 or enables the application to store information to legacy content systems 114, 116, 118, and 119 and/or content system 120. To interact with legacy content systems 114, 116, 118, and 119, content management framework 104 is coupled to adapters 106. In some embodiments, content management framework 104 comprises foundation object classes and core operations and logic. Adapters 106 handle interactions between content management system 100 and legacy systems 114, 116, 118, and 119. Adapters 106 include a plurality of adapters represented by 108, 110, and 112. In some embodiments, adapters 108, 110, and 112 are specific to a type of legacy or other external content system. For example, a type of customer relations management system, or a series of systems from the same vendor with similar interfacing requirements, has a corresponding adapter for communication with content management system 100. In the example shown, the interfacing requirements for legacy content system 118 and 119 are similar and content management system 100 uses adapter 112 to interact with both legacy content system 118 and legacy content system 119.

In some embodiments, adapters 106 translate commands from content management system 100 to the appropriate syntax and format required by a type of legacy or other external content system. In some embodiments, adapters 106 normalize the responses from a given type of legacy or other external content system to the appropriate syntax and format required by content management system 100.

Content system 120 includes content server 122, metadata 124, and content store 126. Content server 122 communicates with content management system 100 and provides stored content and/or metadata, when requested by and/or via content management system 100 and/or stores content and/or associated metadata for content received from and/or via content management system 100. Metadata 124 contains information related to content stored in content store 126. In some embodiments, metadata 124 comprises a meta-catalog of content objects with respect to which one or more content management functions are available to be performed by and/or via content management system 100. In some embodiments, the meta-catalog includes content objects associated with items of content stored in content store 126 and also reference objects associated with items of content stored in legacy or other external content systems. In some embodiments, metadata information in metadata 124 is coupled with content stored in content store 126—for example, retention information is coupled to content so that the retention information are always present and/or utilized for content management system applications.

In various embodiments, content management system 100, content system 120, and legacy content systems 114, 116, 118, and 119 are implemented using one or more hardware units, one or more processing units/devices, one or more storage units/devices, or one or more memory units/devices.

Figure 2:
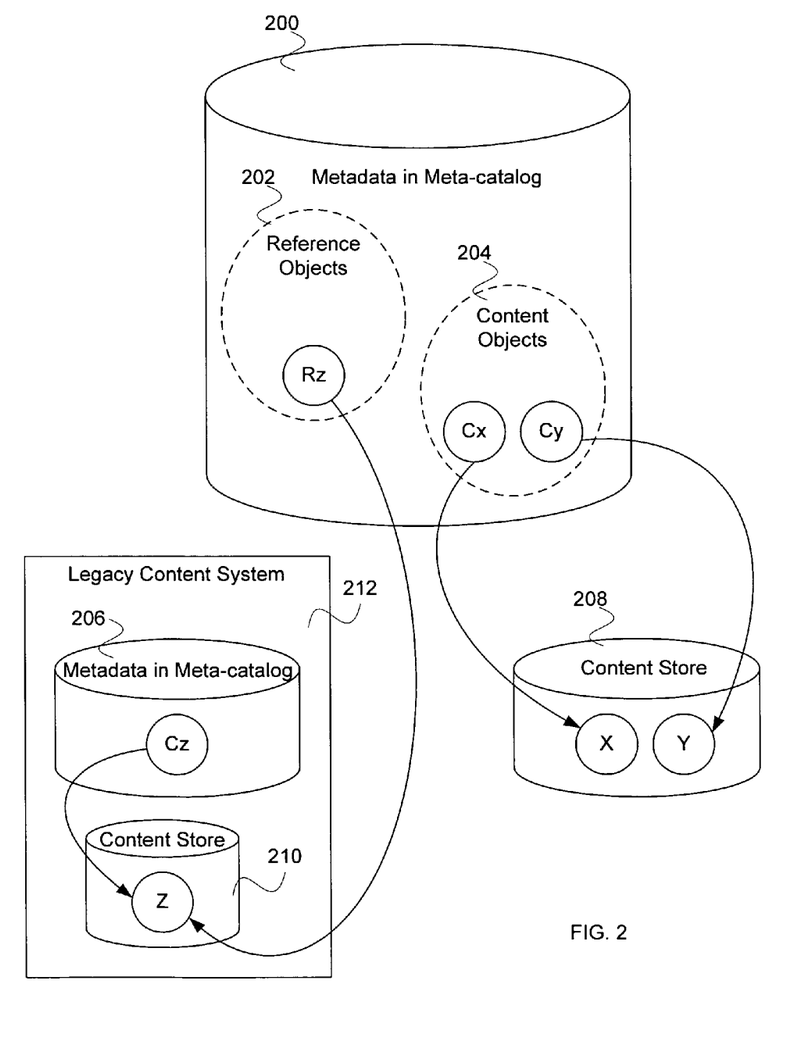
FIG. 2 is a block diagram illustrating an embodiment of reference objects referring to external content.

FIG. 2 is a block diagram illustrating an embodiment of reference objects referring to external content. In some embodiments, metadata in meta-catalog 200 is included in metadata 124 of FIG. 1 and content store 208 is content store 126. In the example shown, metadata in meta-catalog 200 includes content objects 204 that refer to items of content in content store 208. For example, content objects 204 include in the example shown in FIG. 2 content objects Cx and Cy which refer to a content items X and Y, respectively, in content store 208. In various embodiments, the content objects comprise a location pointer, e.g., pointing to a location in content store 208 in which a corresponding item of content is stored, a database row entry, a data structure with information such as content title, keywords associated with content, abstract of content, related documents/information, security information, retention information, or rules associated with information—e.g., publishing rules with regard to other formats such as HTML, PDF, etc., version control rules, or business process rules. In various embodiments, a location pointer is a physical address on a storage device, removable storage media, or in a memory or a logical address that enables access to a location on a storage device, removable storage media, or in a memory. Metadata in meta-catalog 200 also includes one or more reference objects 202, represented in FIG. 2 by Rz, that refer to content in one or more legacy content systems represented in FIG. 2 by legacy content system 212. In some embodiments, legacy content system 212 comprises a repository that has not been ingested directly into the content management system so that the information in the repository is not stored in the content management system and is not controlled directly by the content management system. In some embodiments, the legacy content systems are repositories or information systems that are not desired to be the central manager of information held in multiple systems. In the example shown, legacy content system 212 includes one or more items of content represented by Z in content store 210. A reference object Rz refers to the content Z in content store 210 and as described more fully below enables content management functions to be performed with respect to content item Z by and/or via a content management system associated with meta-catalog 200. The content item Z is represented in a legacy content system metadata 206 by a content object Cz. In this example, the legacy content system is a managed content system that, like the content system with which meta-catalog 200 and content store 208 are associated, generates and maintains a set of metadata in which each item of content under management by the legacy content system 212 is represented by a content object such as content object Cz. In some embodiments, external content stored in an external repository to be managed virtually is stored in an external repository that is not a managed repository, e.g., a content server or file system, such that the external content repository/system does not include an external system metadata such as metadata 206. In some embodiments, a reference object such as Rz is generated and populated at least in part by accessing data comprising and/or associated with content item Z. In some embodiments, a reference object such as Rz is generated and populated at least in part by accessing metadata associated with content item Z, such as content object Cz in the example shown.

Figure 3:
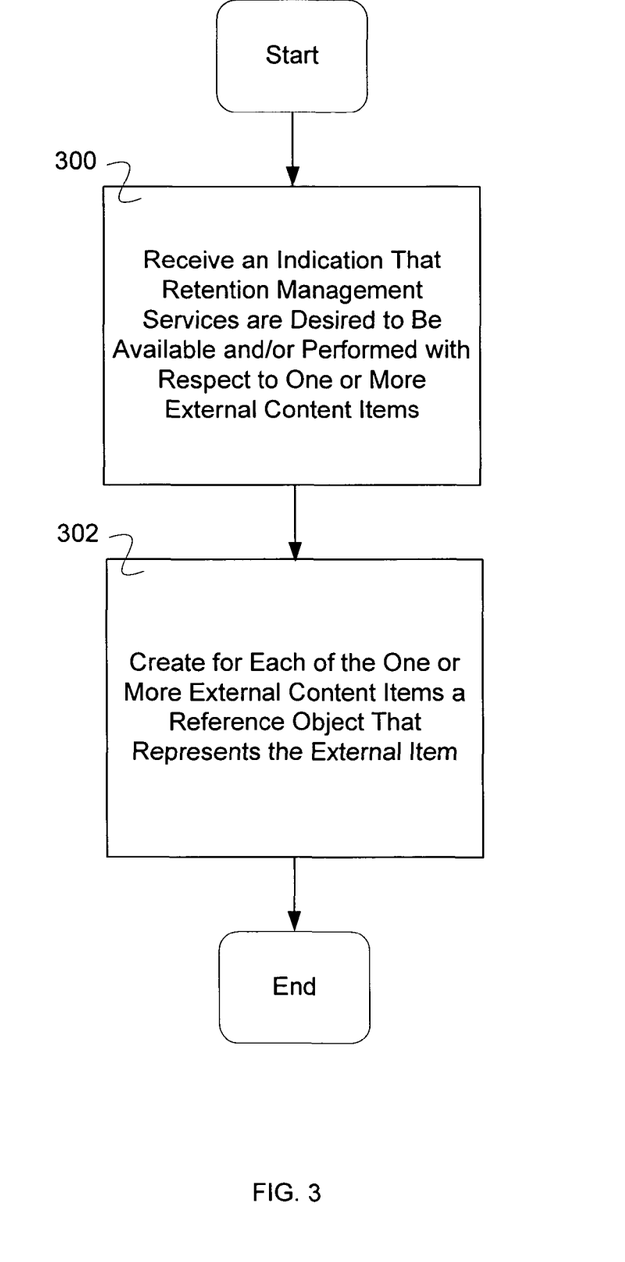
FIG. 3 is a flow diagram illustrating an embodiment of a process for virtual repository management to provide retention management services.

FIG. 3 is a flow diagram illustrating an embodiment of a process for virtual repository management to provide retention management services. In the example shown, in 300 an indication is received that a retention management functionality is desired to be available and/or performed with respect to one or more external content items. In some embodiments, the external content items are in legacy content systems for which it is desired to have centrally available retention management functionality. In some embodiments, virtual repository management of external content held in legacy content systems enables central retention management of content without the expense, difficulty, and/or risk associated with ingesting the contents of the legacy content system into the central content management system. In some embodiments, an indication that a retention management functionality is desired to be available comprises a request that a retention management functionality be performed. In various embodiments, the indication is received from a user, a user system, an application, a content management application, and/or a system administrator. In some embodiments, the indication is received after a search for content is performed across multiple content systems and content is selected for retention management from the search results. For example, search for content related to a law suit across an entire company's content systems locates content that is required to be disclosed and/or preserved; the content is selected and managed for retention by the central content system during the law suit. In 302, for each of the one or more external content items a reference object is created that represents the external content item. In some embodiments, the reference object is stored in the metadata in a meta-catalog. In some embodiments, the reference object provides the necessary information for the content management system to access the corresponding content in a legacy content system.

Figure 4:
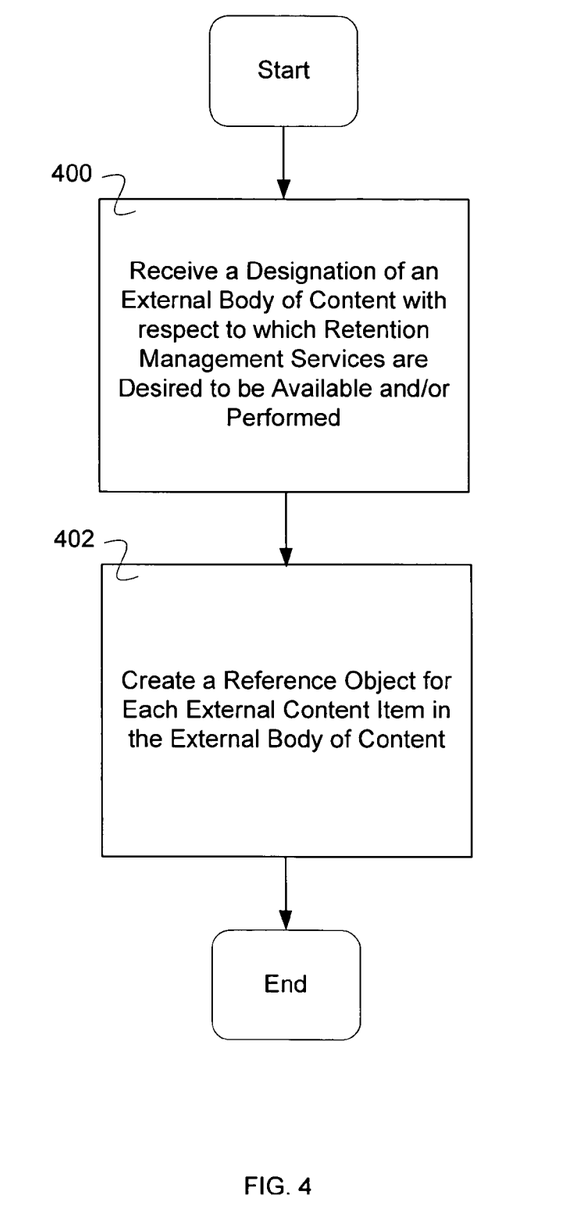
FIG. 4 is a flow diagram illustrating an embodiment of a process for virtual repository management to provide retention management services.

FIG. 4 is a flow diagram illustrating an embodiment of a process for virtual repository management to provide retention management services. In the example shown, in 400 a designation is received that an external body of content is to be taken under retention management. In various embodiments, the designation is received from a user, a user system, an application, a content management application, and/or a system administrator. In 402, a reference object is created for each external item of content in the external body of content. In some embodiments, a crawler is used to locate and select each item of content included in the external body of content. In various embodiments, the reference object includes metadata allowing access to and manipulation of the content that is referred to by the reference object. In some embodiments, the process of FIG. 4 is used to bring entire sets and/or bodies of external content items, e.g., all or a designated subset of content items in an external repository, under virtual management, such that retention management functions are available centrally with respect to the external items.

Figure 5:
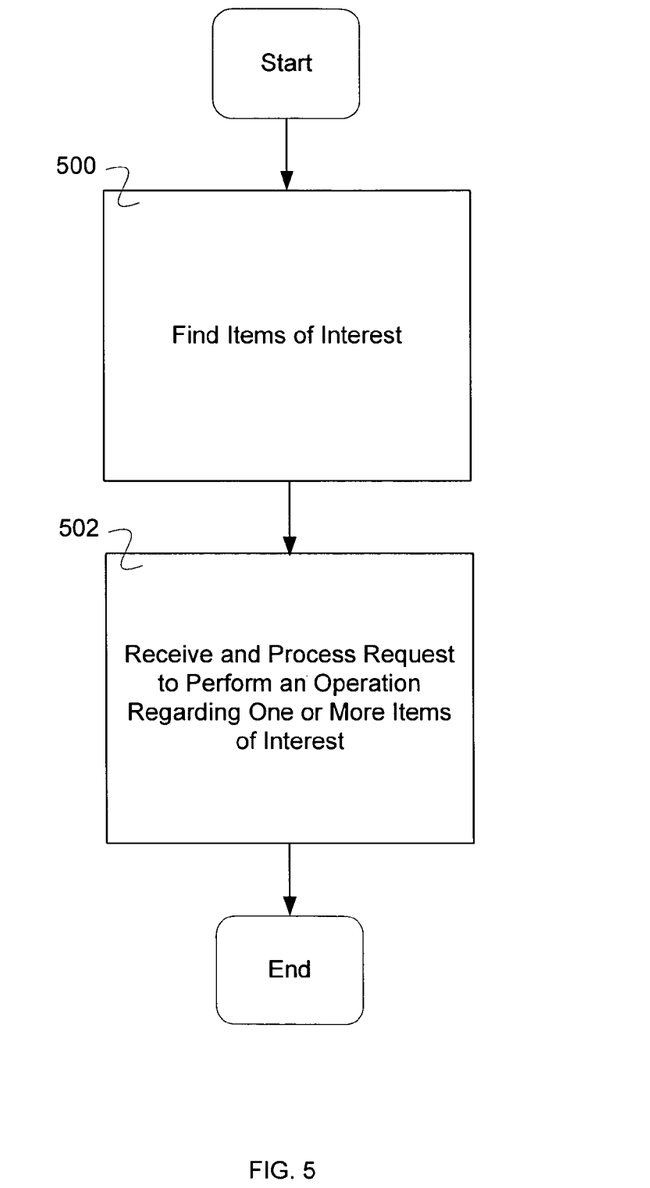
FIG. 5 is a flow diagram illustrating an embodiment of a process for virtual repository management to provide retention management services.

FIG. 5 is a flow diagram illustrating an embodiment of a process for virtual repository management to provide retention management services. In some embodiments, the process of FIG. 5 is used to bring external content items under virtual management as the need/desire arises to perform a retention management function centrally with respect to one or more particular external content items. In some embodiments, the process of FIG. 5 is used instead of and/or in addition to the process of FIG. 4. In the example shown, in 500 items of interest are found. In various embodiments, items of interest are found as a result of one or more searches in one or more repositories, items of interest are located by performing a full text search on a full text index of information in one or more repositories, and/or items of interest are located by performing a search on crawler results of one or more repositories. In 502, a request to perform an operation regarding one or more items of interest is received and processed. In some embodiments, at least a subset of the items of interest may be stored in an external repository and in 502 a reference object is created for any one or more of the items of interest that is/are stored in an external repository, if any, and then the operation is performed regarding the one or more items of interest.

Figure 6:
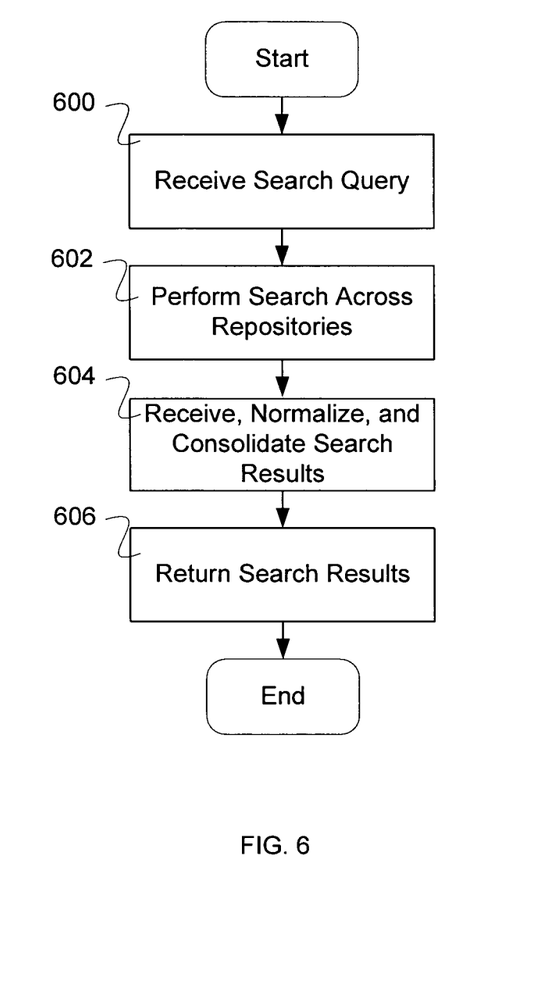
FIG. 6 is a flow diagram illustrating an embodiment of a process for finding objects of interest for virtual repository management.

FIG. 6 is a flow diagram illustrating an embodiment of a process for finding objects of interest for virtual repository management. In some embodiments, the process of FIG. 6 is used to implement 500 in FIG. 5. In the example shown, in 600, a search query is received. In 602, a search is performed across repositories. In some embodiments, the repositories searched include one or more legacy and/or other external content systems. In some embodiments, the search requires translating a search command or series of commands to a command or series of commands appropriate for a given legacy content system. In 604, search results are received, consolidated, and normalized. In some embodiments, the search results require normalization processing in order to format and change syntax so as to be useable by the content management system used to perform the search across repositories. In 606, the search results are returned. In some embodiments, the search results are returned to an application associated with a content management system used to perform the search.

Figure 7:
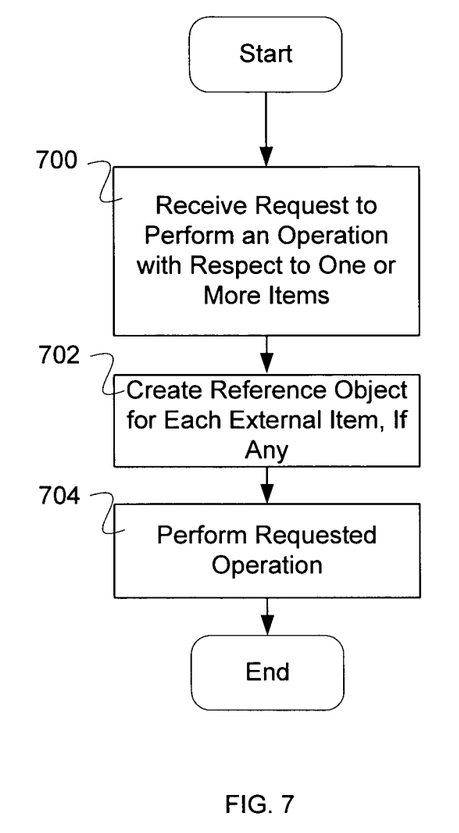
FIG. 7 is a flow diagram illustrating an embodiment of a process for virtual repository management to provide retention management services.

FIG. 7 is a flow diagram illustrating an embodiment of a process for virtual repository management to provide retention management services. In some embodiments, the process of FIG. 7 is used to implement 502 in FIG. 5. In the example shown, in 700, a request is received to perform an operation with respect to one or more items. In some embodiments, the one or more items are associated with one or more legacy content systems. In 702, a reference object is created for each external content item, if any, associated with the request received at 700. In some embodiments, the reference object comprises information that is stored in a structure in a database that enables the content management system, its applications, and its framework to manipulate, access, and perform operations with respect to the external item of content referred to by the reference object. In some embodiments, the reference object allows operations to be performed with respect to the associated external item of content to the same extent as if the content had been originally created within or ingested into the content management system. In 704, the requested operation is performed.

Figure 8:
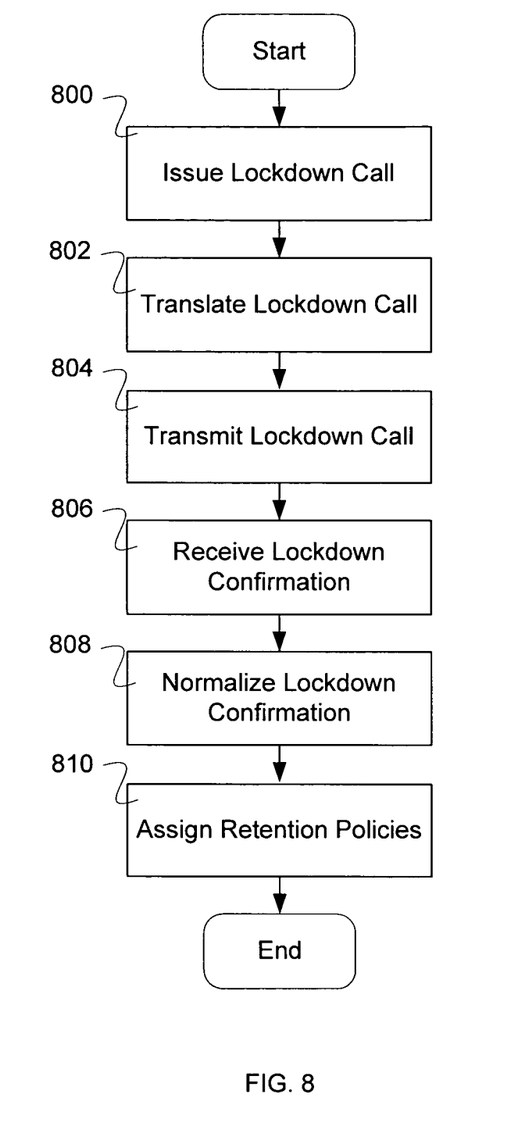
FIG. 8 is a flow diagram illustrating an embodiment of a process for performing a lockdown operation during virtual repository management to provide retention management services.

FIG. 8 is a flow diagram illustrating an embodiment of a process for performing a lockdown operation during virtual repository management to provide retention management services. In some embodiments, the process in FIG. 8 is used to implement 704 of FIG. 7. In the example shown, in 800 a request is issued to perform a lockdown operation with respect to an external content item stored in an external repository under virtual management, e.g., to implement a retention policy with respect to the external content item by preventing an external file from being altered or deleted during a period in which the file is required to be retained. In some embodiments, the request to perform the lockdown operation is issued by an application or by or through a content management framework service or utility. In 802, the request to perform the lockdown operation is translated. In some embodiments, the lockdown request is translated from a first form, format, and/or content, e.g., one associated with the content management framework being used to provide retention management via virtual repository management, to a second form, format, and/or content, e.g., one associated with a destination external repository in which the external content item is stored and/or with which the external content item is otherwise associated. In some embodiments, an adapter translates the request to perform the lockdown operation. In various embodiments, an adapter is used for one type of legacy or other external content system, a series of legacy content systems, systems with similar translation requirements, and/or all types of legacy content systems. In 804, the translated request to perform the lockdown operation is transmitted, e.g., to an external repository in which an associated external content item that is to be retained is stored. In 806, confirmation is received, e.g., from the external repository, that the lockdown operation was performed. In 808, the lockdown confirmation message is normalized. In some embodiments, normalization comprises processing or formatting data comprising the response into a form associated with and/or usable by the retention management system. In 810, a retention management policy is assigned or applied to the content that has been locked down. In some embodiments, the retention management policy is assigned and/or applied at least in part by associating a retention policy with a reference object associated with the external content item to which the retention policy applies.

Figure 9:
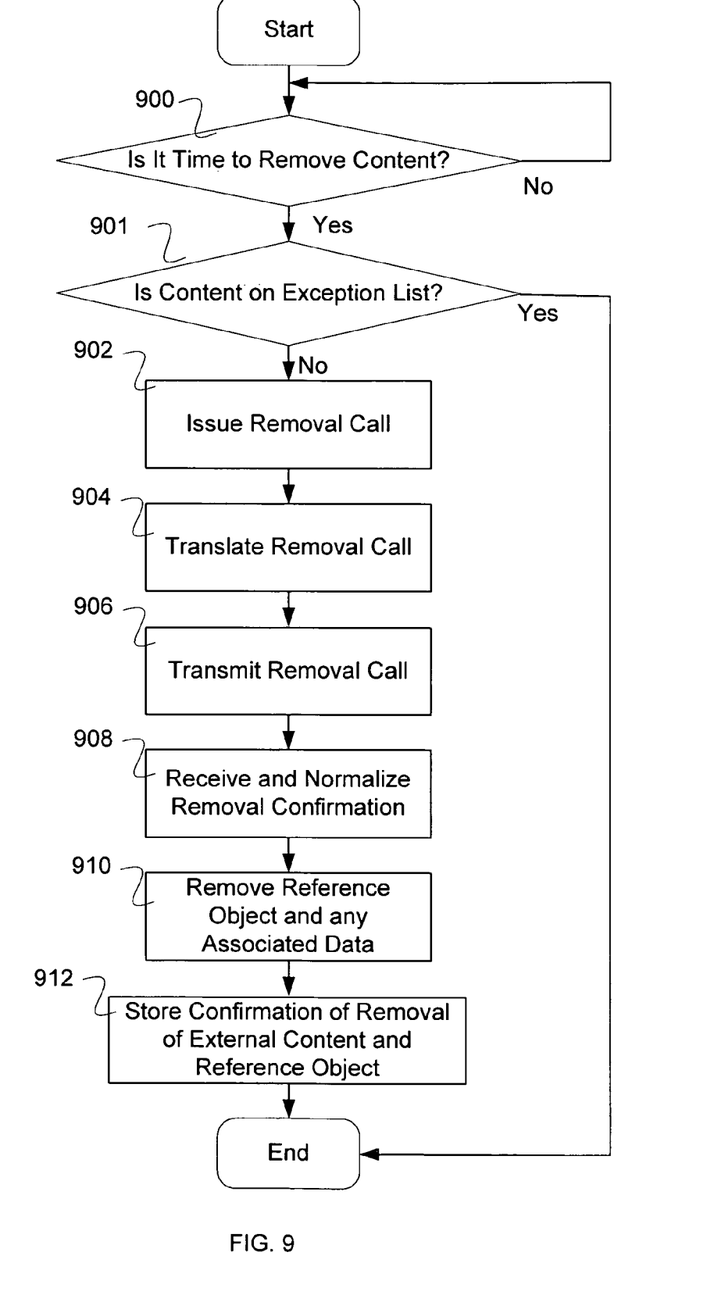
FIG. 9 is a flow diagram illustrating an embodiment of a process for performing a remove operation during virtual repository management to provide retention management services.

FIG. 9 is a flow diagram illustrating an embodiment of a process for performing a remove operation during virtual repository management to provide retention management services. In the example shown, in 900 it is determined if it is time to remove (or otherwise dispose of, e.g., by moving it to offsite storage) a given piece of content. In some embodiments, when an item of external content is controlled by a retention policy, then the item of external content is assigned a fixed time and/or date or an elapsed time and/or date at which the content is scheduled to be removed. In some embodiments, the removal time and/or date are associated with a reference object associated with the item of external content. If it is not time to remove the content, then the process returns control to 900. If it is time to remove the content, then in 901 an exception list is checked to see if the content has been designated to be retained for longer than a retention policy associated with the given piece of content. In some embodiments, an item of content may be controlled by a retention policy, but may be designated at some point for retention and/or disposition other than as prescribed by the policy. For example, content may become important for a legal matter and therefore be required to be retained for the duration of associated legal proceedings; or content may become relevant to an investigation and as a result be required to be retained for the investigation. If the content has been designated to be retained for longer, then the process ends. In some embodiments, if the content has been designated to be retained, then the process returns control to 900 and a further iteration of the process of FIG. 9 is performed, e.g., at a time or upon occurrence of an event that triggers removal and/or other disposition of the content, as would occur, for example, when a lawsuit or investigation for which the content is being retained past its originally scheduled retention period ends. If the content has not been designated to be retained for longer by being on an exception list, then in 902, a request is issued to remove the item of external content. In 904, the removal request is translated. In some embodiments, the translation is performed by an adapter that changes the syntax of format of the request so that it is appropriate for an external repository with which the item of external content is associated. In some embodiments, the external repository comprises any content repository that has not been ingested into or taken under direct control of the content management system. In 906, the translated removal call is transmitted to the external repository. In some embodiments, the translated removal call is transmitted via a network connection to the external repository. In 908, confirmation that the item of external content has been removed (e.g., deleted) is received and normalized. In some embodiments, normalizing the confirmation of removal includes reformatting or changing the syntax of the confirmation so that the confirmation can be appropriately handled by the content management system being used to perform retention management with respect to the item of external content through virtual management of the external repository with which the item of external content is associated. In 910, the reference object associated with the item of external content and any associated data are removed. In some embodiments, the reference object and the associated data are stored in metadata storage similar to 124 of FIG. 1. In 912, verification that the item of external content and the associated reference object and any other associated data have been removed is stored. In some embodiments, the stored verification is auditable so that the removal process of the retention service can be monitored and assessed. In some embodiments, the stored verification includes data comprising and/or associated with all or part of the confirmation received at 908.

In various embodiments, queuing for deletion, queuing for archiving, designating an exception to queuing for deletion, designating an exception to queuing for archiving, approval processes, exporting processes, hold processes, and review processes are required for retention management services and these processes include issuing calls to the legacy content systems, translating and transmitting the calls, receiving confirmation that the calls have been completed and associated information, if any, and normalizing the confirmation call and associated information, if any. In some embodiments, applying a retention policy to content includes initiating processes and/or queuing processes for the content such as holding processes, lockdown processes, archiving processes, removal or deletion processes, review processes, approval processes.

In various embodiments, the techniques described herein are used to provide retention management services with respect to one or more items of external content stored in one or more external repositories. In this way, verifiable, consistent, and central management of retention for items of content stored in multiple repositories, including in some embodiments one or more repositories that do not provide retention management as a native functionality, is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for virtually managing repositories to provide retention management services comprising:
    receiving at a content system an indication that a retention management service is desired to be performed with respect to an external content item stored in an external content system wherein the external content item has not been ingested by the content system that is being used to perform the retention management service, wherein retention management is management of the external content item so that a policy for retaining the external content item and removing the external content item is applied to the external content item, wherein the policy comprises a retention policy and a removal policy; wherein a removal policy comprises removing the external content item based on a received time and/or date of scheduled removal, wherein a retention policy comprises retaining the external content item for a retention time period after which the external content item is removed;
    storing in the content system for each external content item a reference object that represents the external content item, wherein the reference object provides information that enables the content system to perform the retention management service with respect to the external content item;
    issuing a request to lock down the external content item, wherein the lock down prevents the external content item from being altered or deleted;
    determining whether it is time to remove the external content item based at least on the time and/or date of scheduled removal or the retention time period and the reference object representing the external content item,
    in the event it is time to remove the external content item, issuing a request to remove the external content item;
    translating the request to remove the external content item to one or more native operations of the external content system where the external content item is stored;
    receiving a confirmation that the external content item has been removed and translating the confirmation into the appropriate format for the content management system;
    removing the reference object in the content management system that represents the external content item;
    storing a verification that the external content item and the reference object have been removed, wherein the verification comprises at least a part of the confirmation received from the external content system and is auditable.

2. The method as in claim 1, wherein the external content item comprises one of a set of one or more external content items.

3. The method as in claim 1, wherein the reference object is created prior to the indication being received.

4. The method as in claim 1, wherein the reference object is created in response to an indication that the retention management service is desired to be performed.

5. The method as in claim 1, wherein a user indicates that the retention management services are desired.

6. The method as in claim 1, wherein an application indicates that the retention management services are desired.

7. The method as in claim 1, wherein the reference object is part of a meta-catalog of managed content items.

8. The method as in claim 1, further comprising translating the request to lock down, transmitting the translated request, receiving a confirmation that an operation associated with the request to lock down was performed.

9. The method as in claim 1, wherein the external content item is associated with a legacy content system.

10. The method as in claim 1, wherein issuing the request to remove includes queuing the request to remove the external content item.

11. The method as in claim 1, wherein the retention policy comprises archiving which comprises moving an external content item to another repository and removing the external content item.

12. The method as in claim 1, further comprising checking an exception list, wherein an exception list comprises an exclusion list of external content items that are to not be removed according to the retention or removal policy.

13. The method as in claim 12, wherein in the event that the external content item is determined to be on the exception list, a request is not issued to queue the external content item for removal, and in the event that the external content item is determined not to be on the exception list, a request is issued to queue the external content item for removal.

14. A system for virtually managing repositories to provide retention management services comprising:
    a processor configured to:
    receive at a content system an indication that a retention management service is desired to be performed with respect to an external content item stored in an external content system wherein the external content item has not been ingested by the content system that is being used to perform the retention management service, wherein retention management is management of the external content item so that a policy for retaining the external content item and removing the external content item is applied to the external content item, wherein the policy comprises a retention policy and a removal policy, wherein a removal policy comprises removing the external content item based on a received time and/or date of scheduled removal, wherein a retention policy comprises retaining the external content item for a retention time period after which the external content item is removed;
    store in the content system for each of external content item a reference object that represents the external content item, wherein the reference object provides information that enables the content system to perform the retention management service with respect to the external content item;

issue a request to lock down the external content item, wherein the lock down prevents the external content item from being altered or deleted;

determine whether it is time to remove the external content item based at least on the time and/or date of scheduled removal or the retention time period and the reference object representing the external content item, in the event it is time to remove the external content item, issue a request to remove the external content item;

translate the request to remove the external content item to one or more native operations of the external content system where the external content item is stored;

receive a confirmation that the external content item has been removed and translating the confirmation into the appropriate format for the content management system;

remove the reference object in the content management system that represents the external content item;

store a verification that the external content item and the reference object have been removed, wherein the verification comprises at least a part of the confirmation received from the external content system and is auditable;

a memory coupled to the processor configured to store instructions for the processor.

15. A computer program product for virtually managing repositories to provide retention management services, the computer program product being embodied in a computer readable storage medium and comprising computer instructions for:

receiving at a content system an indication that a retention management service is desired to be performed with respect to an external content item stored in an external content system wherein the external content item has not been ingested by the content system that is being used to perform the retention management service, wherein retention management is management of the external content item so that a policy for retaining the external content item and removing the external content item is applied to the external content item, wherein the policy comprises a retention policy and a removal policy, wherein a removal policy comprises removing the external content item based on a received time and/or date of scheduled removal, wherein a retention policy comprises retaining the external content item for a retention time period after which the external content item is removed;

storing in the content system for each external content item a reference object that represents the external content item, wherein the reference object provides information that enable the content system to perform the retention management service with respect to the external content item;

issuing a request to lock down the external content item, wherein the lock down prevents the external content item from being altered or deleted;

determining whether it is time to remove the external content item based at least on the time and/or date of scheduled removal or the retention time period and the reference object representing the external content item, in the event it is time to remove the external content item, issuing a request to remove the external content item;

translating the request to remove the external content item to one or more native operations of the external content system where the external content item is stored receiving a confirmation that the external content item has been removed and translating the confirmation into the appropriate format for the content management system;

removing the reference object in the content management system that represents the external content item;

storing a verification that the external content item and the reference object have been removed, wherein the verification comprises at least a part of the confirmation received from the external content system and is auditable.

16. The system as in claim 14, wherein the external content item comprises one of a set of one or more external content items.

17. The system as in claim 14, wherein the reference object is created prior to the indication being received.

18. The system as in claim 14, wherein the reference object is created in response to an indication that the retention management service is desired to be performed.

19. The system as in claim 14, wherein a user indicates that the retention management services are desired.

20. The system as in claim 14, wherein an application indicates that the retention management services are desired.

21. The system as in claim 14, wherein the reference object is part of a meta-catalog of managed content items.

22. The system as in claim 14, further comprising translating the request to lock down, transmitting the translated request, receiving a confirmation that an operation associated with the request to lock down was performed.

23. The system as in claim 14, wherein the external content item is associated with a legacy content system.

24. The system as in claim 14, wherein issuing the request to remove includes queuing the request.

25. The system as in claim 14, wherein the retention policy comprises archiving which comprises moving an external content item to another repository and removing the external content item.

26. The system as in claim 14, wherein the processor is further configured to check an exception list, wherein an exception list comprises an exclusion list of external content items that are to not be removed according to the retention or removal policy.

27. The system as in claim 26, wherein in the event that the external content item is determined to be on the exception list, a request is not issued to queue the external content item for removal, and in the event that the external content item is determined not to be on the exception list, a request is issued to queue the external content item for removal.

28. The method as in claim 12, wherein in the event that the external content item is on the exception list, a request to remove the external content item is not issued.

29. The system as in claim 26, wherein in the event that the external content item is on the exception list, a request to remove the external content item is not issued.

* * * * *